United States Patent Office 3,364,801
Patented Jan. 23, 1968

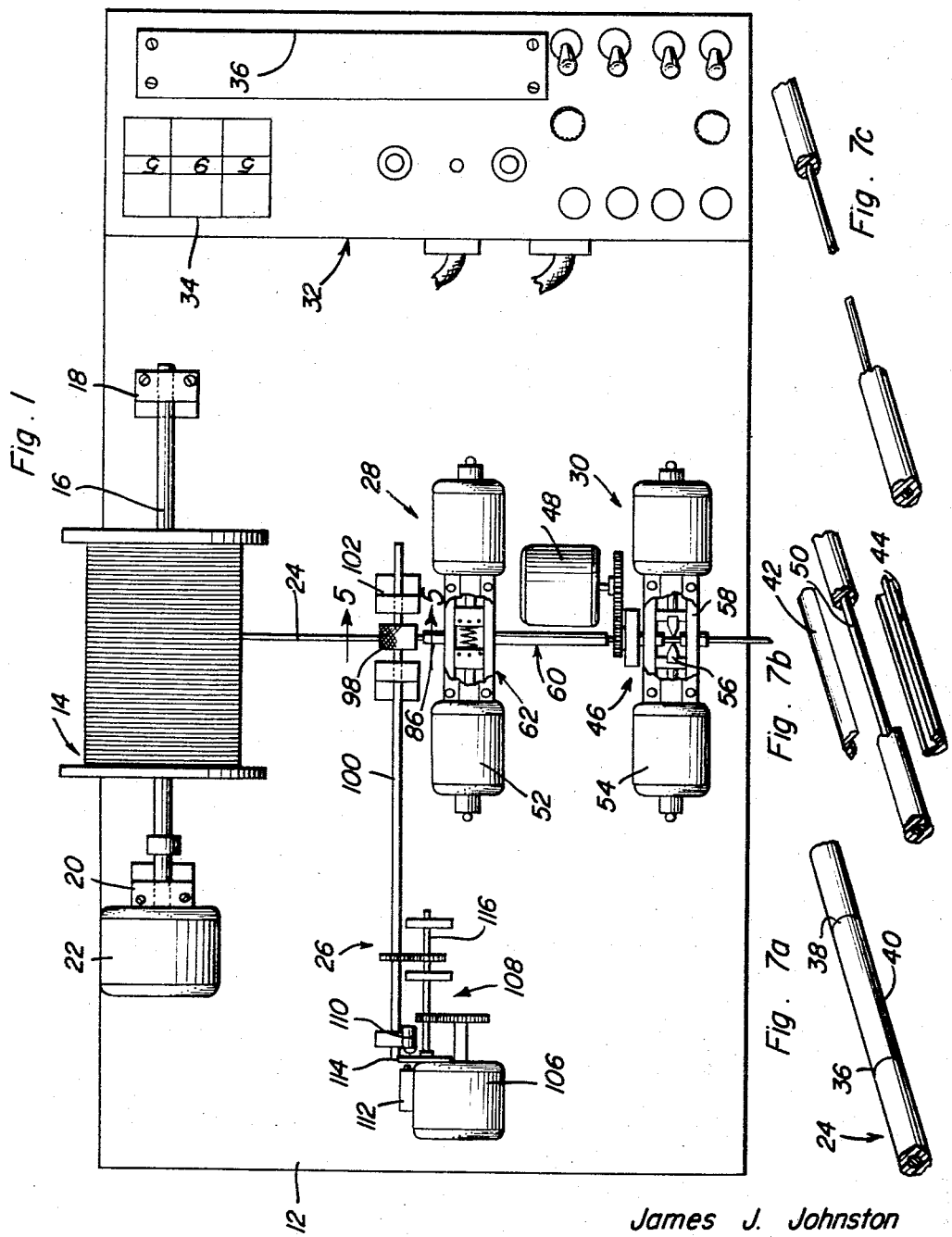

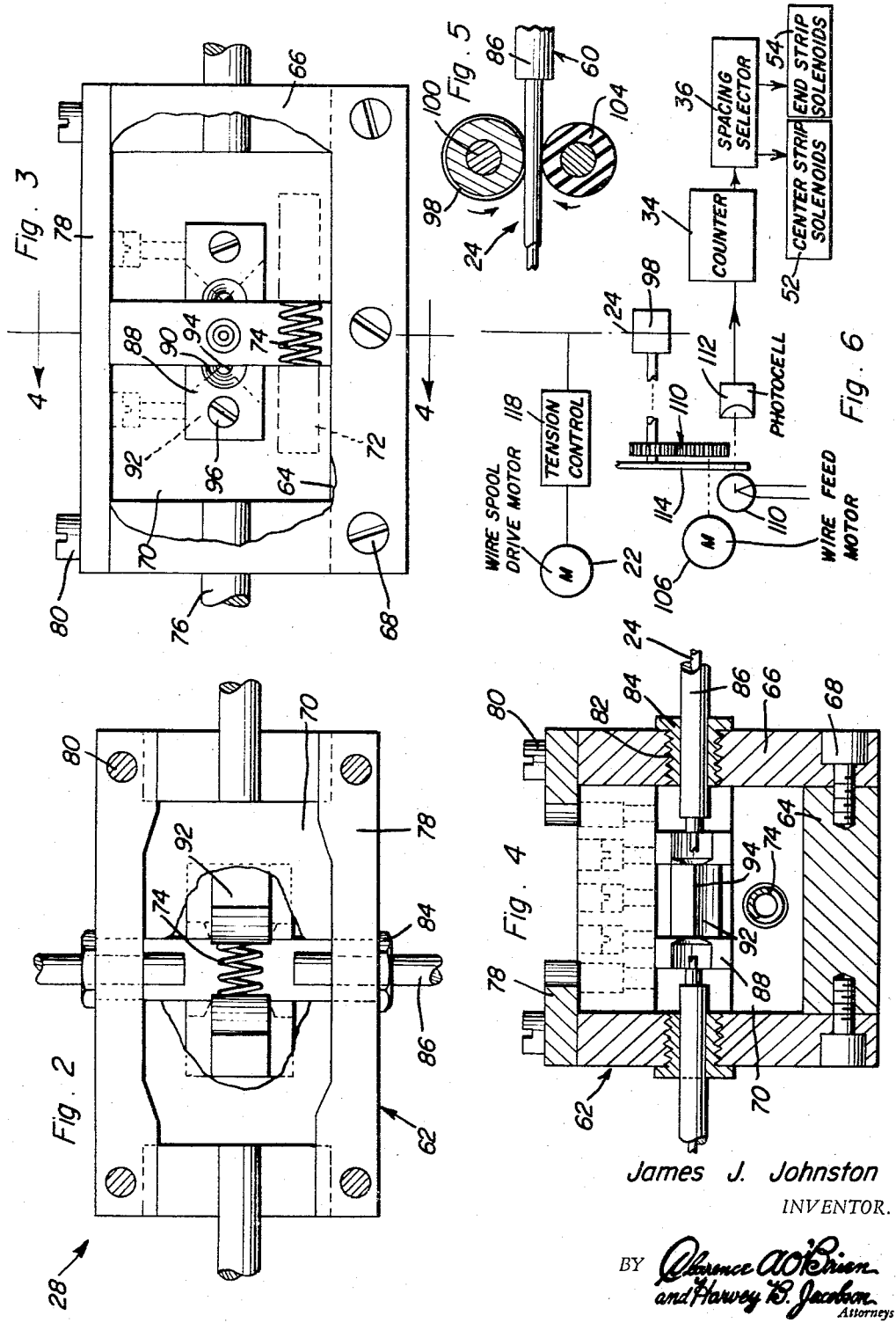

3,364,801
WIRE CENTER STRIPPER DIE ASSEMBLY
James J. Johnston, Northford, Conn., assignor of one-sixth each to Raymond Poturnicki, New Haven, Walter J. Bedard, Jr., Meriden, and Edward P. Cattey, Jr., Wallingford, Conn.
Filed Mar. 6, 1967, Ser. No. 620,899
10 Claims. (Cl. 81—9.51)

ABSTRACT OF THE DISCLOSURE

Apparatus for stripping the insulating sheathing from electrical wire at spaced locations utilizing stripper die devices that pierce the wire sheathing as it is fed through a guide tube by a wire feeding drive mechanism. An electronic spacing control synchronized by the wire feeding drive mechanism intermittently actuates the stripper devices for center stripping and end stripping lengths of wire.

Background of the invention

This invention relates to apparatus for center stripping sheathed wire continuously fed from a storage spool.

Jumper wires or "common buss" wires are generally formed from a continuous length of insulated wire by removing insulation from the wire at spaced locations and cutting the wire into specified lengths where it has been stripped. In accomplishing the foregoing objectives by use of automatic machinery, a particular problem arises in accurately spacing the portions of the insulated wire that are stripped so that the operation of cutting and bending dies may be synchronized to operate only on stripped portions of the wire fed thereto from a center stripping die assembly.

Summary of the invention

In accordance with the present invention, insulated wire being continuously processed by passage through both center stripping and other die assemblies is subjected to compressive forces for accurate length accountability utilizing an electronic photocell sensing device.

An additional feature of the present invention resides in the novel center stripping die assembly and its operational attributes in effecting the stripping of specified lengths of insulation from the wire.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Brief description of the drawing figures

FIGURE 1 is a simplified top plan view of typical apparatus constructed in accordance with the present invention.

FIGURE 2 is a top plan view with parts broken away showing the center stripping die assembly.

FIGURE 3 is a front elevational view with parts broken away of the center stripping die assembly.

FIGURE 4 is a sectional view taken substantially through a plane indicated by section line 4—4 in FIGURE 3.

FIGURE 5 is a partial, enlarged sectional view taken substantially through a plane indicated by section line 5—5 in FIGURE 1.

FIGURE 6 is a diagrammatic illustration showing the control system associated with the present invention.

FIGURES 7a, 7b and 7c are perspective views showing the various stages in end stripping insulated wire in accordance with the present invention.

Description of the preferred embodiment

Referring now to the drawings in detail, FIGURE 1 illustrates the arrangement of the apparatus in accordance with the present invention generally denoted by reference numeral 10. The apparatus which may be mounted on any suitable frame structure 12 includes a storage spool 14 rotatably supported on the frame by a shaft 16 journaled between the spaced bearing assemblies 18 and 20 on either side thereof. The spool is driven by a tension controlling drive motor 22 connected to the shaft 16 in order to unwind therefrom a continuous supply of insulated wire 24. The wire is however positively fed by means of a wire feeding drive assembly 26 sequentially through a center stripping die assembly generally referred to by reference numeral 28 and other die assemblies such as the end cutting die assembly 30. Operation of the apparatus is electronically controlled by means of a control assembly generally referred to by reference numeral 32 including among other things, a counter component 34 and a spacing selector 36.

The present invention resides in the particular arrangement of components, their relationship to the center stripping die assembly 28 and generation of spacing control signals derived from the wire feeding drive assembly 26 all of which are shown. However, the details of the electronic control assembly 32 receiving the spacing control signals to control operation of the die assemblies are not essentially to the invention so that diagrammatic illustration presented in FIGURE 6 will suffice for the purpose of understanding the invention.

The general objective achieved by use of the apparatus of the present invention are best illustrated in FIGURES 7a, 7b and 7c wherein the insulated wire 24 is shown in FIGURE 7a as being initially cut at 36 and 38 in spaced planes perpendicular to the longitudinal axis of the wire, the cuts 36 and 38 being interconnected by two cuts 40 on diametrically opposite sides of the wire extending parallel to the longitudinal axis of the wire. The cuts 36, 38 and 40 which pierce only the sheathing, are made as the wire passes through the center stripping die assembly 28. The stripped sheathing half sections 42 and 44 as shown in FIGURE 7b may then be removed from the wire by any suitable removal mechanism 46 as diagrammatically shown in FIGURE 1, geared to a drive motor 48 for operation thereof. Thus, the conductive core 50 of the wire is exposed before it enters the end cutting die assembly 30. Some or all of the center stripped portions of the wire may therefore be cut to form end stripped wire sections as shown in FIGURE 7c.

The wire is center stripped while passing through the die assembly 28 by simultaneous energization of opposed actuating solenoids 52 in order to form the cuts 36, 38 and 40 aforementioned in connection with FIGURE 7a. Opposed solenoids 54 associated with the die assembly 30 are also energized at the proper instant to sever the exposed core 50 of the wire by means of inward displacement of blade assemblies 56 slidably guided by the frame 58. The wire which is fed through the die assemblies 28 and 30 is guided by an elongated guide tube assembly generally referred to by reference numeral 60.

Referring now to FIGURES 2, 3 and 4, it will be observed that the center stripping die assembly 28 includes a frame assembly generally referred to by reference numeral 62 which includes a bottom wall 64 to which a pair of parallel spaced side walls 66 are connected by means of the fasteners 68. Slidably mounted on the bottom wall 64 and between the side walls 66, are a pair of channel-shaped slide members 70, the channels of which open toward each other. The opposed surfaces of the channel slide members 70 are provided with aligned sockets 72 receiving the ends of a coil spring 74 which yieldably hold the channel slide members spaced apart. Each channel member is thereby biased into engagement with the end of a solenoid actuated rod 76 by means of which the channel members are displaced toward each other against the bias of the spring 74 when the solenoids 52 are energized. The slide members 70 are retained within the frame assembly by means of the top retaining plates 78 secured to the upper edges of the side walls 66 by the fasteners 80.

The side walls 66 are provided with axially aligned, internally threaded openings 82 threadedly receiving the coupling elements 84 that mount the guide tube sections 86 of the guide assembly 60 extending into the space between the channel slide members 70. The wire 24 is thereby guided so as to extend centrally between the opposed channels in the slide members 70. A pair of cutter blocks 88 having a semi-circular cutting edges 90 are removably held within the channel of each slide member 70 by means of the fasteners 96. Thus, the cutting edges 90 form the cuts 36 and 38 when the slide members are displaced into engagement with each other by the solenoids 52. The cutter blocks 88 are longitudinally spaced from each other in the axial direction of wire movement by means of the blade members 92 having cutting edges 94 that extend between the cutting edges 90 to form the cuts 40 piercing the wire sheathing on either side of the wire between the sheathing cuts 36 and 38. The cutter blocks 88 are secured to either side of the blade members 92 by the fasteners 96. It will therefore be apparent that intermittent energization of the solenoids 52 will effectively center strip the wire being continuously fed through the guide tube assembly 60.

Of particular significance, is the location of the wire feeding drive assembly 26 so as to engage the wire between the supply spool 14 and the guide tube assembly 60 in order to exert a compressive force on the wire tending to cause outward bowing thereof each time the wire is engaged by the center stripping die assembly 28. In this manner precise control may be exercised over the spacing between the center stripped portions of the wire. The wire is thus fed at a continuous rate such as two inches per second by means of an externally knurled drive roller 98 as shown in FIGURES 1 and 5 connected to a drive shaft 100 journalled by the bearing assemblies 102 on either side of the wire. An idler roller 102 made of a yieldable material engages the wire on the side thereof opposite the drive roller 98 so as to maintain a constant rate of feeding of the wire by the feed roller. The drive shaft 100 for the feed roller is driven by a wire feeding drive motor 106 geared to the drive shaft by the counter shaft gearing 108. The drive shaft 100 is thereby driven at the proper speed and mounts on one end thereof adjacent to the motor 106, a photocell activating lamp 110. Accordingly, rotation of the drive shaft 100 will align the lamp 110 with the photocell detector 112 fixedly mounted for example on the motor casing. A beam chopping disk 114 may also be driven by the counter shaft 116 associated with the gearing and provided with apertures designed to control the spacing between pulses produced each time an aperture in the disk is aligned with the lamp 110 and photocell detector 112, as a function of the wire feed rate. The pulse output of the photocell detector is fed to the control assembly 32 through which energization of the solenoids 52 and 54 associated with the die assemblies 28 and 30 are energized as diagrammatically shown in FIGURE 6. The spacing of the pulses may be changed in accordance with different requirements by changing the disk 114 in order to control operation of the die assemblies. Further, a suitable tension control 118 as shown in FIGURE 6 is associated with the wire spool drive motor 22 in order to maintain a proper tension on the wire as it is being fed and thereby regulate the compressive force exerted thereon by the wire feeding drive assembly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a source of wire having a sheathing thereon, elongated guide means through which the sheathed wire is fed, a plurality of die assemblies operatively mounted about the guide means for sequential lateral engagement with the wire, and wire feeding drive means engageable with the sheathed wire between said source and the guide means for feeding the wire into the guide means at a constant linear speed to compressively stress the wire in an axial direction when laterally engaged by the die assemblies.

2. The combination of claim 1 including spacing control means responsive to operation of the wire feeding drive means for rendering the die assemblies intermittently operative to engage the wire.

3. The combination of claim 2 wherein one of said assemblies includes a frame connected to a portion of the guide means exposing the sheathed wire, cutter means movably mounted by the frame for piercing the sheathing of the wire in planes perpendicular to the said axial direction at spaced locations, blade means connected to the cutter means for simultaneously piercing the sheathing in a plane parallel to said axial direction between said spaced locations and actuating means connected to the blade means for displacing the same into engagement with the sheathing.

4. The combination of claim 3 wherein said wire feeding drive means comprises an externally knurled feeding roller in constant engagement with said sheathed wire, an idler roller of yieldable material engaging the wire in opposed relation to the feeding roller, a feed motor, and gear means drivingly connecting the feed motor to the feeding roller for rotation thereof at a constant speed withdrawing the wire from the source under tension.

5. The combination of claim 4 wherein said source of wire includes a spool on which the wire is stored, and tension controlling motor means connected to the spool for unwinding the wire therefrom.

6. The combination of claim 5 wherein said spacing control means includes photosensing means driven by the gear means for establishing intermittent pulses to operate the actuating means.

7. The combination of claim 1 wherein one of said die assemblies includes a frame connected to a portion of the guide means exposing the sheathed wire, cutter means movably mounted by the frame for piercing the sheathing of the wire in planes perpendicular to the said axial direction at spaced locations, blade means connected to the cutter means for simultaneously piercing the sheathing in a plane parallel to said axial direction between said spaced locations and actuating means connected to the blade means for displacing the same into engagement with the sheathing.

8. The combination of claim 1 wherein said wire feeding drive means comprises an externally knurled feeding roller in constant engagement with said sheathed wire, an idler roller of yieldable material engaging the wire in opposed relation to the feeding roller, a feed motor, and gear means drivingly connecting the feed motor to the feeding roller for rotation thereof at a constant speed withdrawing the wire from the source under tension, said source of wire including a spool on which the wire is stored, and tension controlling motor means connected to the spool for unwinding the wire therefrom.

9. The combination of claim 8 including spacing control means driven by the gear means for rendering the wire stripping assembly intermittently operative to engage the wire.

10. In combination with a sheathed wire fed through an elongated guide, center stripping means comprising, drive means for continuously moving the wire through the guide in an axial direction, a frame connected to a portion of the guide exposing the sheathed wire, cutter means movably mounted by the frame for piercing the sheathing of the wire in planes perpendicular to said axial direction at spaced locations, blade means connected to the cutter means for simultaneously piercing the sheathing in a plane parallel to said axial direction between said spaced locations, actuating means connected to the blade means for displacing the same into engagement with the sheathing, and spacing control means responsive to operation of the drive means for intermittently rendering the actuating means operative.

References Cited

UNITED STATES PATENTS

| | | | |
|---|---|---|---|
| 1,396,903 | 11/1921 | Weber | 81—9.5 |
| 2,934,982 | 5/1960 | Ewbanks | 81—9.51 |
| 3,095,768 | 7/1963 | Walstrom | 81—9.51 |
| 3,162,391 | 12/1964 | Westcott et al. | 29—605 X |

MILTON S. MEHR, *Primary Examiner.*